A. J. WILL.
BAKING PAN.
APPLICATION FILED AUG. 22, 1914.
1,212,864.
Patented Jan. 16, 1917.
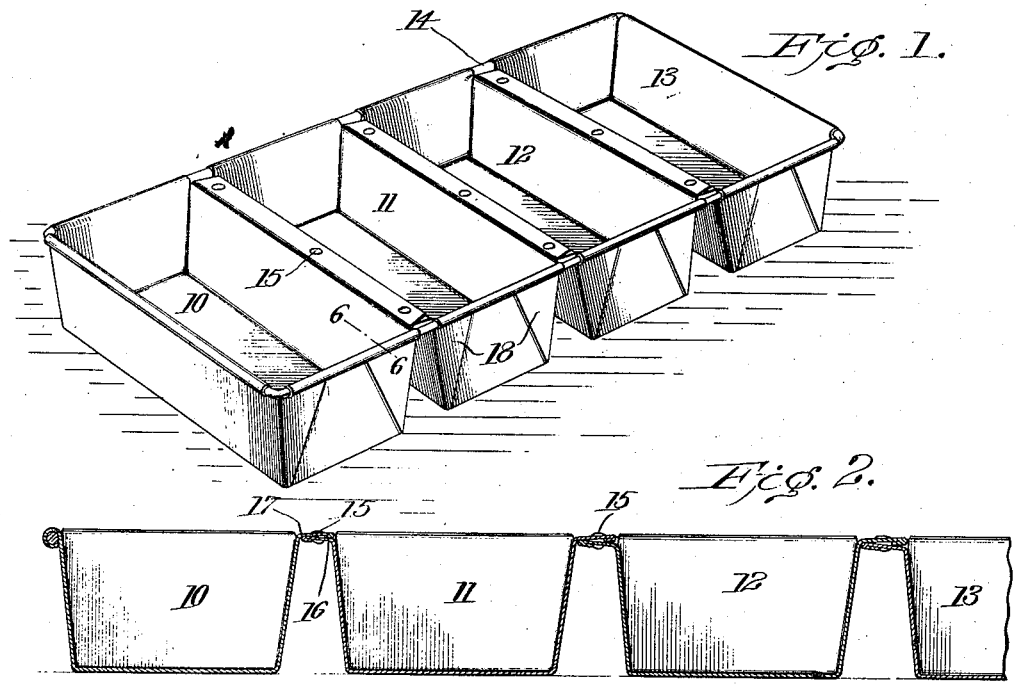
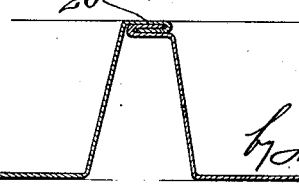
Witnesses
G. F. Balder
B. M. Kent
Inventor
Anthony J. Will
by Foster Freeman Watson & Coit
Attorneys

UNITED STATES PATENT OFFICE.

ANTHONY J. WILL, OF BALTIMORE, MARYLAND, ASSIGNOR TO THE AUGUST MAAG COMPANY, OF BALTIMORE, MARYLAND, A CORPORATION OF MARYLAND.

BAKING-PAN.

1,212,864. Specification of Letters Patent. Patented Jan. 16, 1917.

Application filed August 22, 1914. Serial No. 858,097.

*To all whom it may concern:*

Be it known that I, ANTHONY J. WILL, a citizen of the United States, and resident of Baltimore, Maryland, have invented certain new and useful Improvements in Baking-Pans, of which the following is a specification.

This invention relates to baking pans and more particularly to bread pans for use in bakeries.

It is the object of the invention to provide a series of connected pans which are suitably reinforced to withstand the service to which they are subjected and which will not accumulate an undesirable amount of grease and other material on the outside thereof.

A further object of the invention is to provide a series of similar pans which can be made with the same dies and which have their meeting edges connected together so as to reinforce the sides of the pans and stiffen the series as a unit.

The novel features of the invention will be apparent from the following description taken in connection with the accompanying drawings, in which, Figure 1 is a perspective view of a series of pans embodying the invention; Fig. 2 is a longitudinal section thereof; Fig. 3 is a fragmentary section similar to Fig. 2 and showing another form of connection between the meeting edges of the pans; and Fig. 4 is an enlarged section on the line 6—6 of Fig. 1.

Referring to the drawings, 10, 11, 12 and 13 indicate a series of rectangular pans which are surrounded and united by means of a rod 14. As is customary in baking pans the upper edges are provided with flanges which serve as reinforcements and in the case of the end pans 10 and 13 the flanges on three sides are turned over the rod 14. The intermediate pans 11 and 12 have the flanges at the ends thereof turned over the rod 14 and in this way all of the pans are formed into a unit by means of the rod 14.

As shown in Figs. 1 and 2, the flanges on the meeting edges of the pans are overlapped and secured together by means of rivets 15. All of the flanges on the pans are preferably of the same width so that all of the pans of a series may be formed with the same set of dies. From Fig. 2 it will appear that the flange 16 of the pan 11 has its outer end folded and arranged in the corner between the flange 17 and the side of the adjacent pan so that the flange 16 acts as a reinforcement for the side of the pan 10. The flange 17 has its outer edge folded and being riveted to the flange 16 serves to protect and reinforce the side of the pan 11. In forming the pans the triangular corner folds 18 are preferably arranged on the ends of the pans and held by the turned edge 19, as shown in Fig. 4.

Instead of riveting the overlapped flanges together, as shown in Figs. 1 and 2, they may be folded, interlocked and secured as shown at 20 in Fig. 3 and it will be understood that in either construction the distance between the pans of the series may be varied as desired. By using the round rod 14 to secure the pans together and also to reinforce them a much more sanitary construction is provided than where bars are used to connect the pans together, as the grease and dough has a tendency to accumulate beneath and upon the bars and thus make them more or less unsanitary. Furthermore, when the rod 14 becomes bent, in using the pans, the series may be easily straightened out.

I am aware that it has heretofore been proposed to make up a series of bread pans with intermediate bridging pieces connecting the flanges of adjacent pans but such constructions are undesirable on account of the expense and additional operations required in inserting the bridging pieces and the inherent weakness of such constructions. By directly overlapping the flanges of adjacent pans and securing them together I produce a structure which is simpler, cheaper, much stronger and which is more sanitary, in that it has fewer joints or seams. My improved multiple bread pan requires no reinforcement excepting the marginal wire, whereas in prior structures in which the pans have been connected by bridging pieces, wires were required under the pans to secure the necessary rigidity, thus preventing nesting of the pans which is an essential feature in modern bakeries. It is well known that on account of changes of temperature and rough handling the multiple baking pans become warped and distorted and my reinforcements, comprising the overlapped and secured flanges and the marginal wire, being all in the same plane, permit of readily straightening the series of pans.

It will be observed that in all of the forms illustrated the interior of the pans is free from rivets and other devices which would scar the bread.

Having described my invention what I claim and desire to secure by Letters-Patent is, 1. A series of rectangular baking pans arranged side by side and each having flanges on all four sides, a reinforcing member surrounding the series of pans, each of the end pans of the series having the flanges on three of its sides turned over said member and each of the intermediate pans having the flanges on two of its sides turned over said member, the remaining flanges being folded, overlapped and secured directly together in pairs throughout substantially their full length.

2. A series of rectangular baking pans formed from blanks of uniform size having flanges on all of their sides, a reinforcing member surrounding the series of pans, each of the end pans of the series having the flanges on three of its sides turned over said member and each of the intermediate pans having the flanges of two of its sides turned over said member, the remaining flanges being folded, overlapped and riveted together in pairs throughout substantially their full length.

In testimony whereof I affix my signature in presence of two witnesses.

ANTHONY J. WILL.

Witnesses:
GEO. H. LITZ,
ALLYN A. GARDNER.